US009913212B2

(12) United States Patent
Chuttani et al.

(10) Patent No.: US 9,913,212 B2
(45) Date of Patent: *Mar. 6, 2018

(54) CARRIER NETWORK ACCESS FOR MULTI-SIM DEVICES

(71) Applicant: Apple Inc., Cupertino, CA (US)

(72) Inventors: Harshit Chuttani, Newark, CA (US); Chandiramohan Vasudevan, Sunnyvale, CA (US); Matthew S. Klahn, San Francisco, CA (US); Rajesh Ambati, Los Altos Hills, CA (US); Arun G. Mathias, Los Altos, CA (US); Vikram Yerrabommanahalli, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/496,296

(22) Filed: Apr. 25, 2017

(65) Prior Publication Data

US 2017/0230904 A1 Aug. 10, 2017

Related U.S. Application Data

(63) Continuation of application No. 14/725,638, filed on May 29, 2015, now Pat. No. 9,681,452.

(51) Int. Cl.
H04W 4/00 (2009.01)
H04W 48/18 (2009.01)
H04W 8/18 (2009.01)
H04L 12/28 (2006.01)
H04W 84/04 (2009.01)
(Continued)

(52) U.S. Cl.
CPC ......... *H04W 48/18* (2013.01); *H04L 12/2859* (2013.01); *H04W 8/18* (2013.01); *H04W 84/042* (2013.01); *H04W 84/12* (2013.01); *H04W 88/06* (2013.01)

(58) Field of Classification Search
CPC ......... H04W 28/0215; H04W 36/0011; H04M 15/7556
USPC ...... 455/458, 418, 422.1, 558, 435.2, 435.1, 455/437; 370/338, 328, 331
See application file for complete search history.

(56) References Cited

U.S. PATENT DOCUMENTS

| 8,406,741 B2 | 3/2013 | Kang et al. |
| 2009/0117875 A1 | 5/2009 | Weigele et al. |
| 2013/0288751 A1 | 10/2013 | Zheng et al. |

(Continued)

*Primary Examiner* — Kiet Doan
(74) *Attorney, Agent, or Firm* — Meyertons Hood Kivlin Kowert & Goetzel, P.C.; Jeffrey C. Hood

(57) ABSTRACT

Apparatuses, systems, and methods for multi-SIM user equipment (UE) devices to perform data operations with a packet data network of a carrier associated with a first SIM of the UE. An indication of a requested data operation with the packet data network of the carrier associated with the first SIM of the UE may be received. The UE may be operating in a dual SIM mode in which the packet data network of the carrier associated with the first SIM of the UE is unavailable. It may be determined if one or more conditions for performing the requested data operation are present and if a data path to perform the requested data operation is available. The requested data operation may be performed if the one or more conditions for performing the requested data operation are present and if a data path to perform the requested data operation is available.

20 Claims, 8 Drawing Sheets

(51) Int. Cl.
*H04W 84/12* (2009.01)
*H04W 88/06* (2009.01)

(56) References Cited

U.S. PATENT DOCUMENTS

| | | |
|---|---|---|
| 2014/0220981 A1 | 8/2014 | Jheng et al. |
| 2014/0295831 A1 | 10/2014 | Karra et al. |
| 2015/0079961 A1 | 3/2015 | Maguire et al. |
| 2015/0237497 A1* | 8/2015 | Chen .................... H04W 8/183 455/558 |
| 2015/0289221 A1* | 10/2015 | Nayak ................. H04W 60/005 455/435.1 |
| 2015/0312717 A1* | 10/2015 | Shih ..................... H04W 8/183 455/456.1 |

* cited by examiner

CARRIER NETWORK ACCESS FOR MULTI-SIM DEVICES

PRIORITY CLAIM

The present is a continuation of U.S. patent application Ser. No. 14/725,638, entitled "Carrier Network Access for Multi-SIM Devices," filed May 29, 2015, which is hereby incorporated by reference in its entirety as though fully and completely set forth herein.

FIELD

The present application relates to wireless devices, including apparatuses, systems, and methods for accessing a carrier network by a multi-SIM wireless device.

DESCRIPTION OF THE RELATED ART

Wireless communication systems are rapidly growing in usage. Further, wireless communication technology has evolved from voice-only communications to also include the transmission of data, such as Internet and multimedia content. In certain scenarios a wireless device may include or be capable of utilizing multiple subscriber identity modules (SIMs). Determining how to operate effectively and efficiently with multi-SIM capability may be a challenging problem. Thus, improvements in the field are desired.

SUMMARY

Embodiments are presented herein of apparatuses, systems, and methods for a multi-SIM wireless device to perform data operations with the packet data network of a carrier associated with a first SIM of the device. A wireless device may be capable of operating in either of a single SIM mode or a dual SIM mode. In the dual SIM mode, access to the packet data network of the carrier associated with the first SIM may not be available. For example, the first SIM may generally be used for circuit switched services such as voice and SMS messages, and a second SIM may generally be used for data (e.g., packet switched) services, while the wireless device is operating in the dual SIM mode. In the single SIM mode, access to the packet data network of the carrier may be available. For example, both circuit switched services and packet switched services may be available using the first SIM in the single SIM mode.

While such an arrangement may generally be advantageous in many scenarios, such as a roaming scenario in which the second SIM can provide a relatively inexpensive local data plan while the first SIM would only be able to provide relatively expensive roaming data, on some occasions operations involving data traffic with the packet data network of the carrier associated with the first SIM could be initiated while the wireless device is in the dual SIM mode without access to the packet data network of the carrier associated with the first SIM. For example, a (e.g., incoming or outgoing) multimedia messaging service (MMS) message, a visual voicemail (VVM) message, an operation related to a carrier provided service, and/or any of various other operations associated with the first SIM of the UE might be triggered while the UE is in the dual SIM mode without access to the packet data network of the carrier associated with the first SIM.

According to the techniques described herein, the wireless device may be able to determine if a data path is available to perform such a data operation in such circumstances, to determine if conditions are appropriate to perform the data operation, and to perform the data operation if data path is available and conditions are appropriate. For example, if the data operation can be performed over the Internet (e.g., to indirectly access the carrier packet data network), and the wireless device is connected to the Internet (e.g., by way of Wi-Fi and/or cellular data service using the second SIM), this may provide a data path to perform the operation. As another possibility, fallback to the single SIM mode (e.g., if the data operation cannot be performed over the Internet or the wireless device is not connected to the Internet) in which access to the packet data network of the carrier associated with the first SIM may be available may be used as the data path to perform the operation.

Since fallback to single SIM may at least potentially cause disruption to user and/or background activities (e.g., if the second SIM of the wireless device is engaging or might engage in data exchange), the wireless device may determine whether conditions are appropriate to perform the data operation prior to performing the data operation, e.g., if the data operation might be performed using fallback to single SIM. For example, if the second SIM is not engaging in data exchange and a display of the wireless device is off, it may be the case that falling back to single SIM mode to perform the data operation does not disrupt any user or background activities. Alternatively, if a user of the wireless device initiated the data operation and/or is actively using an application associated with the data operation, the data operation may be sufficiently important to warrant potential disruption to other activities, in which case falling back to single SIM mode to perform the data operation may also be considered acceptable. If fallback to single SIM mode is used to perform the data operation, the wireless device may return to dual SIM mode once the data operation is complete.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
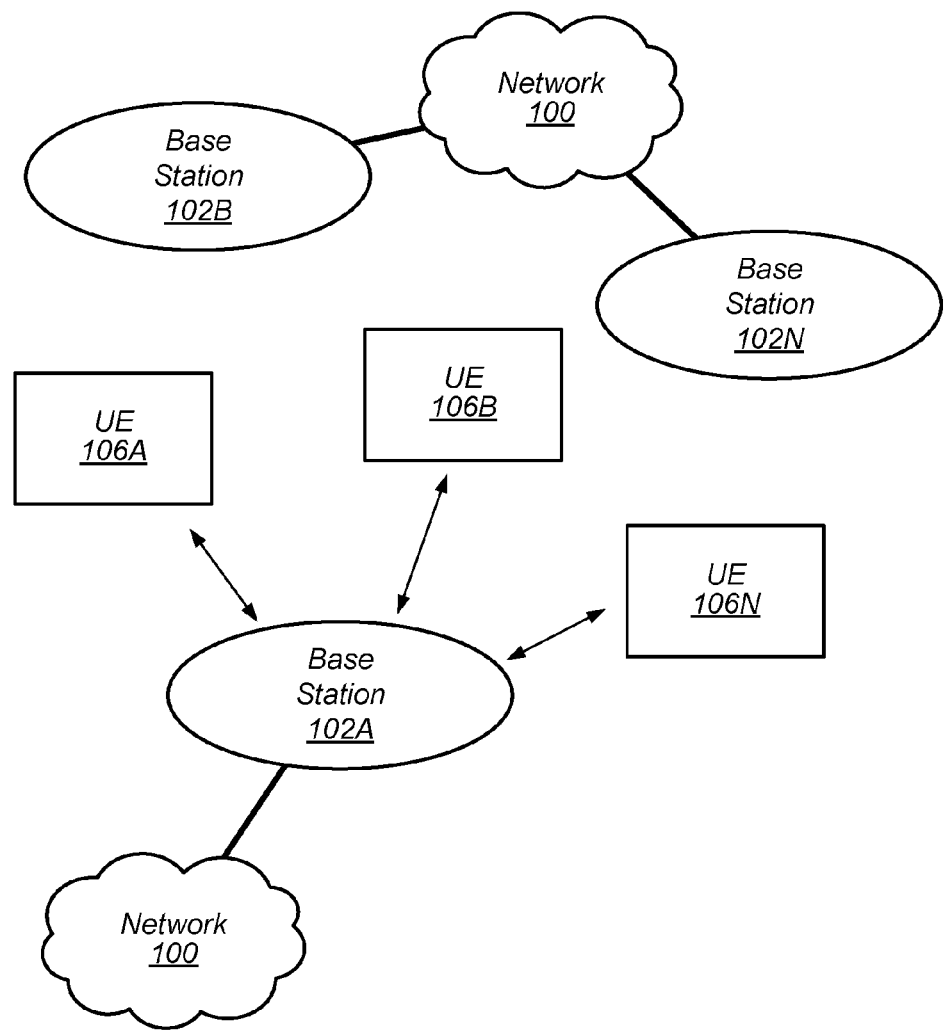
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
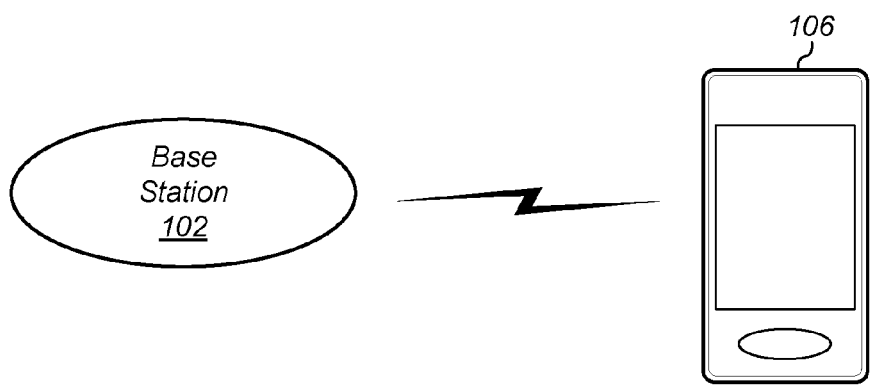
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE and 1×RTT (or LTE and GSM), and separate radios for communicating using each of Wi-Fi and Bluetooth. Other configurations are also possible.

Figure 3:
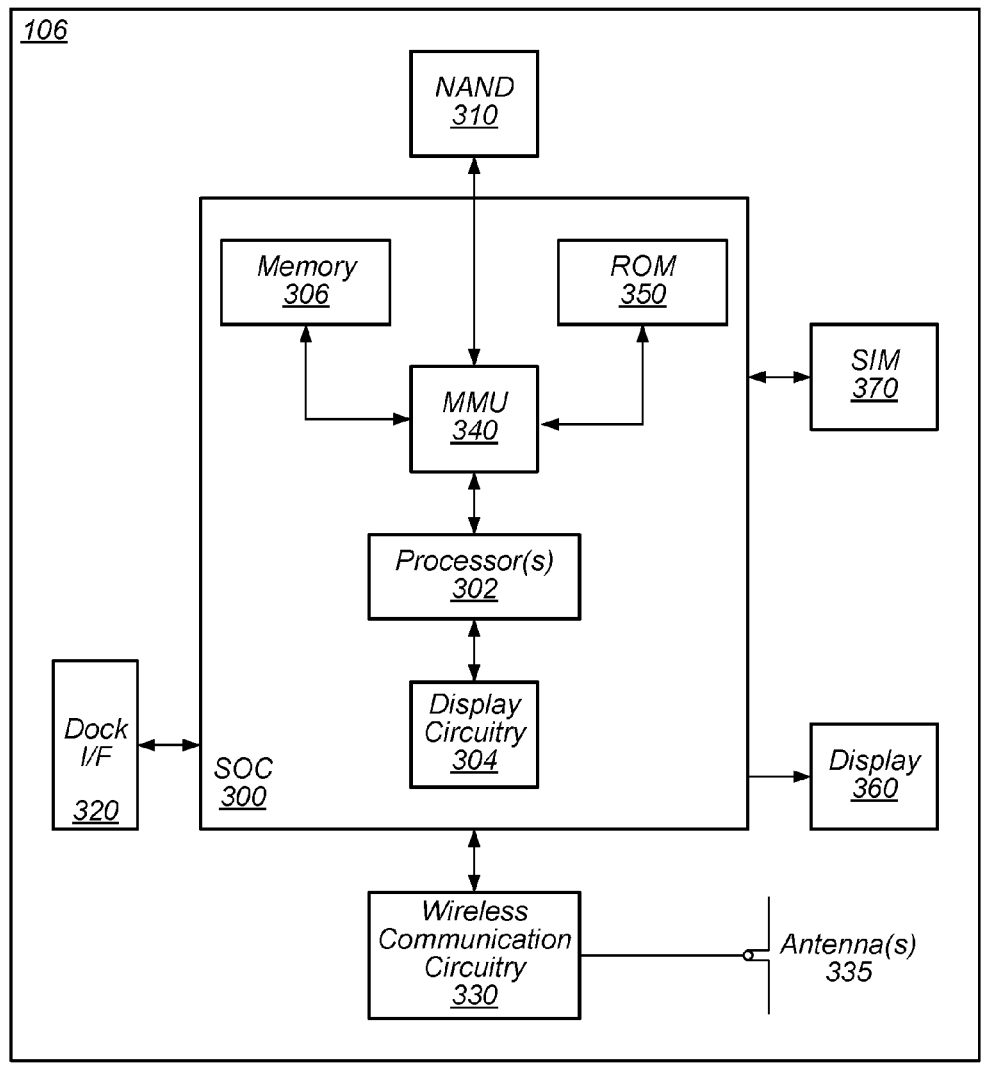
FIG. 3 illustrates an example block diagram of a UE according to some embodiments.

FIG. 3—Block Diagram of a UE

FIG. 3 illustrates an example block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As noted above, the UE 106 may be configured to communicate wirelessly using multiple wireless communication technologies. As further noted above, in such instances, the wireless communication circuitry 330 may include radio components which are shared between multiple wireless communication technologies and/or radio components which are configured exclusively for use according to a single wireless communication technology. As shown, the UE 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As shown, the UE 106 may also include or be coupled to a SIM (Subscriber Identity Module) 370. The SIM 370 may be implemented as an application on a smart card, in some embodiments. The smart card may itself be referred to as a SIM card in some cases. As one example, the SIM 370 may be an application which executes on a Universal Integrated Circuit Card (UICC). The smart card may also include (e.g., store and/or execute) one or more other applications, if desired. The smart card may be removable.

Alternatively, the SIM 370 may be implemented as an embedded SIM (eSIM). In this case, the SIM 370 may be implemented in device hardware and/or software. For example, in some embodiments, the UE 106 may include an embedded UICC (eUICC), e.g., a device which is built into the UE 106 and is not removable. The eUICC may be programmable, such that an eSIM may be implemented on the eUICC. In other embodiments, the eSIM may be installed in UE 106 software, e.g., as program instructions stored on a memory medium (such as memory 306 or NAND 310) executing on a processor (such as processor 302) in the UE 106.

In some embodiments, the UE 106 may be a multi-SIM device, or may at least be multi-SIM capable. Each SIM of such a UE 106 may be implemented in any of various ways, including as a removable SIM or as an embedded SIM, among various possibilities. Dual SIM dual standby (DSDS) and dual SIM dual active (DSDA) are two examples of possible multi-SIM configurations which may be implemented by a UE 106, according to various embodiments.

The subscriber identity information may be used to identify the UE 106 to its subscriber's carrier cellular network. The subscriber identity may also be used outside of the "home" area in which the subscriber's carrier provides cellular service in some situations, for example if the subscriber's carrier has arranged any roaming agreements with other network operators so that the visited network will recognize the subscriber identity information and allow access to the network.

Note that the area in which a subscriber identity may be used to obtain cellular service via the carrier with which the subscriber identity is associated may be considered a "local service area" for the subscriber identity, in which locations the subscriber identity may be considered "local". In other words, as used herein, a UE 106 may be considered able to obtain "local service" in a location using a subscriber identity if the carrier associated with (e.g., which provided) the subscriber identity provides cellular service in that location.

Any areas in which the subscriber identity may be used to obtain cellular service via another carrier than that with which the subscriber identity is associated (e.g., via one or more roaming agreements) may be considered a "roaming service area" for the subscriber identity. In other words, as used herein, a UE 106 may be considered able to obtain "roaming service" in a location using a subscriber identity if carrier with which a roaming agreement has been negotiated by the carrier associated with the subscriber identity provides cellular service in that location.

Any areas in which the subscriber identity may not be used to obtain cellular service via the carrier with which the subscriber identity is associated or any other may be considered a "no service area" for the subscriber identity. In other words, as used herein, a UE 106 may be considered able to obtain "no service" in a location using a subscriber identity if neither the carrier associated with the subscriber identity nor any other carrier with which a roaming agreement has been negotiated by the carrier associated with the subscriber identity provides cellular service in that location. Note that cellular service may still be available (for example using a different subscriber identity associated with a local carrier) in locations for which no service is available using a particular subscriber identity, though it is also possible that no cellular service may be available at all in some (e.g., remote) locations.

As described herein, the UE 106 may include hardware and software components for implementing part or all of the methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
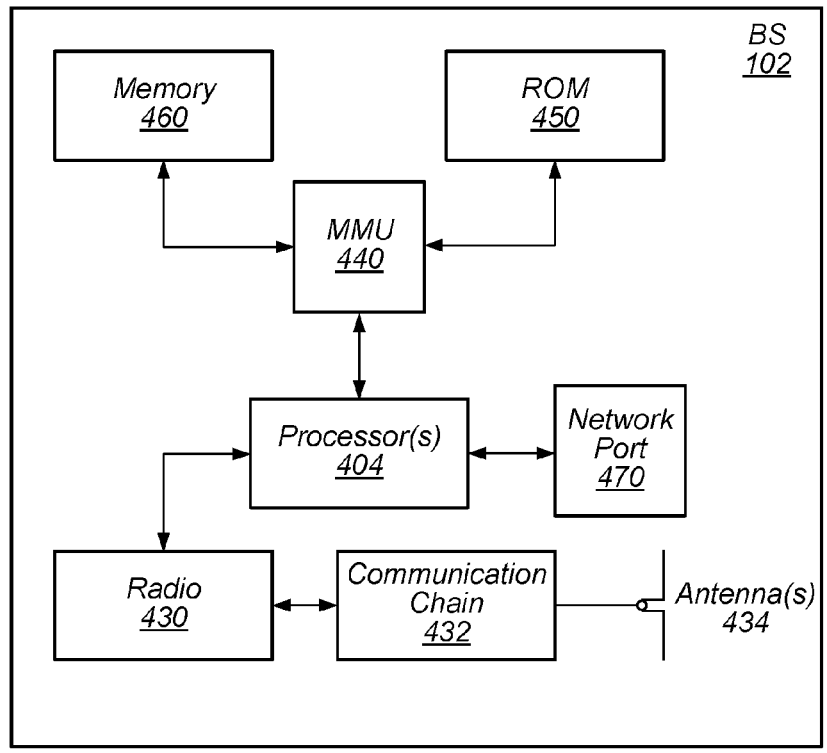
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

As previously noted, in some scenarios a wireless device may be capable of utilizing multiple subscriber identity modules (SIMs). For example, dual SIM support may enable a device to be simultaneously registered with two SIMs, potentially on two different networks. Dual SIM support may include dual SIM dual standby (DSDS) support, in which a device may be simultaneously registered with two SIMs but may actively communicate with one of the networks at a time (e.g., using a shared radio), or dual SIM dual active (DSDA) support, in which a device may be simultaneously registered with two SIMs and may simultaneously actively communicate with two networks at a time, among various dual SIM configurations.

Dual SIM support may be implemented in any of various ways, as desired. For example, a wireless device may provide dual SIM functionality only when the device is in a roaming state (e.g., with respect to a particular SIM such as a primary SIM of the wireless device, or possibly with respect to all SIMs of the device), or only when the device is registered with a home network, or both when the device is roaming and when the device is registered with a home network, among various possibilities. As another example, when dual SIM functionality is implemented different SIMs may have different availabilities with respect to voice and data communication. Thus as one possibility, a primary SIM (e.g., associated with a first subscription) might be made available for voice communication, while a secondary SIM (e.g., associated with a second subscription) might be made available for data communication. Alternate arrangements (e.g., primary SIM available for data, secondary SIM available for voice; both primary and secondary SIMs available for both voice and data; both primary and secondary SIMs available for voice only or for data only, etc.) are also possible. As a still further example, when dual SIM functionality is implemented, different SIMs may have different availabilities with respect to different radio access technologies (RATs); for example, one or more RATs available to one SIM might not be available to the other SIM (and/or vice versa), and/or one or both SIMs might have different RAT availability depending on whether the wireless device is operating in a dual SIM mode or a single SIM mode. As one possible configuration, a SIM might be configured to use any of GSM, WCDMA, and/or LTE for voice and/or data communications when operating in a single SIM mode, and might be configured with the same capabilities or only a subset of those capabilities (e.g., voice only and GSM only, as one possibility) when operating in a dual SIM mode.

Numerous other configurations are also possible and should be considered within the scope of this disclosure.

Note also that in some instances, the specific configuration of a dual SIM capable wireless device at a particular time may result from any combination of hardware and/or software features of the wireless device, subscription characteristics of the SIMs used with the wireless device, and/or user preference(s), among various possible considerations and/or constraints.

In some scenarios, it may be the case that a SIM provides packet switched services in one mode of operation and not in another. For example, as one possibility, a wireless device might be configured to use a dual SIM mode when a primary SIM of the device is in a roaming state. In order to avoid data roaming charges with the primary SIM (and/or for any of various other possible reasons), a secondary SIM with a local data plan may be used in the dual SIM mode to provide packet switched (data) services, and the primary SIM may be used in the dual SIM mode to provide circuit switched (voice) services. In such a scenario, packet switched services may not be available using the primary SIM when in dual SIM mode, and so the wireless device may not be able to access a packet switched data network of a carrier (e.g., cellular service provider) associated with the primary SIM.

Figure 5:
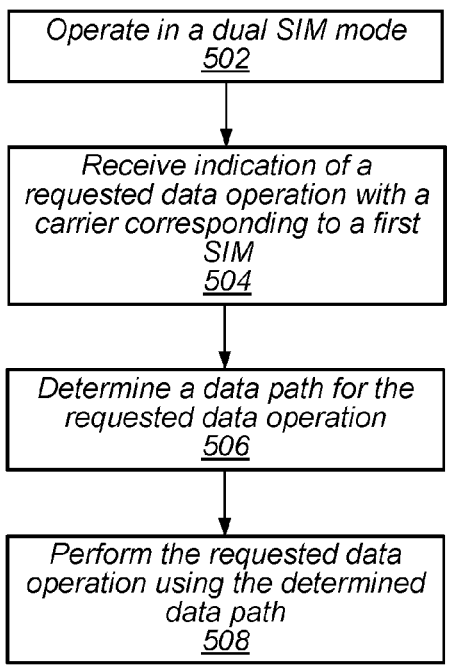
FIG. 5 is a flowchart diagram illustrating an example method by which a multi-SIM capable UE may perform a data operation with a carrier network, according to some embodiments.

If the wireless device wishes to perform a data operation (e.g., send or retrieve a multimedia messaging service (MMS) message, retrieve a visual voicemail (VVM) message, or perform any of various other subscription specific operations) with the carrier network of the primary SIM when in such a dual SIM mode, this may present a difficulty. FIG. 5 is a flowchart diagram illustrating an example method that may be performed by a multi-SIM capable UE to access a carrier network in such a scenario.

The method shown in FIG. 5 may be used in conjunction with any of the computer systems or devices shown in the above Figures, among other devices. This method may be used in various types of cellular communication systems across any of a variety of cellular technologies. In various embodiments, some of the elements of the scheme shown may be performed concurrently, in a different order than shown, or may be omitted. Additional and/or alternative elements may also be performed as desired. As shown, the method of FIG. 5 may operate as follows.

In 502, a UE may operate in a dual SIM mode. In the dual SIM mode, packet switched (PS) services may not be available using a first (e.g., primary) SIM of the UE. For example, the UE may be a wireless device that operates in dual SIM mode with the first SIM available for voice services and a second SIM available for data services when the first SIM is roaming, such as previously described. Any number of alternate scenarios in which PS services are not available using the first SIM, such as if the first SIM is out-of-service at a particular time, are also possible.

Note that while the SIMs of the UE may be distinguished herein by the use of the terms "first" and "second" for the sake of clarity, it should be noted that this is not intended to imply any ordinal relation between the SIMs such as whether a SIM is a primary SIM or a secondary SIM, or to imply that a primary/secondary relationship exists between the SIMs at all; the "first SIM" may be either a primary SIM or a secondary SIM, while the "second SIM" may likewise be either a primary or secondary SIM, or the SIMs may be considered peers, among various possible embodiments.

In 504, an indication of a requested data operation with a carrier associated with the first SIM may be received. The data operation may include any of various possible data operations, such as MMS, VVM, and/or any of various other operations that include data (e.g., hypertext transfer protocol (HTTP)) traffic exchanges with a carrier network (e.g., between the UE and a server in the carrier network).

Note that the indication may be received in any of various possible ways. As one possibility, the indication may be received from a user interface, and may be based on user input requesting the data operation. For example, a MMS message and a request to send the MMS message may be generated via the user interface. As another example, a short messaging service (SMS) message (e.g., which may be received via circuit switched (CS) communication, which may be available by way of the first SIM in the dual SIM mode) indicating that an incoming MMS or VVM is available may be received from the carrier associated with the first SIM. As still another example, the indication may be received indirectly by way of another network, such as the Internet, using an alternate network interface, such as a Wi-Fi network interface, or via PS services available using the second SIM.

In 506, a data path for the requested operation may be determined. Since in the dual SIM mode the first SIM may not provide PS services, it may be the case that the UE is not able to access the carrier network to perform the requested data operation directly using the first SIM while in the dual SIM mode. Accordingly, an alternate data path may be selected.

In some instances (e.g., possibly depending on the nature of the requested operation and/or carrier network access permission) it may be possible to perform the requested operation indirectly (e.g., by way of another network, such as the Internet) as an alternative to accessing the carrier PS network using PS services from the first SIM. For example, an alternate network interface, such as a Wi-Fi network interface, or cellular PS services available using the second SIM, may be usable in some instances to complete the requested data operation. Thus, in some embodiments, it may be determined if the requested data operation can be performed using a data path other than using cellular PS services from the first SIM. If it is determined that the requested data operation with the carrier PS network can be performed using an alternate data path (e.g., via the Internet), it may be determined if there is a network interface available by which the operation can be performed.

Note that in some embodiments, there may be a preferred order of alternate network interfaces to use for the requested data operation. For example, if a Wi-Fi network interface is available and connected, this may be selected for the data path of the requested data operation. If no Wi-Fi network interface is available and connected, but a local data plan (e.g., providing PS services) is available by way of the second SIM of the UE, this may be selected for the data path of the requested operation. Other preferential selection orders (e.g., involving similar and/or different network interface options) are also possible.

In some instances, it may be the case that PS services are available to the UE using the first SIM in a single SIM mode. Thus, as another possibility, to perform the requested data operation, it may be possible to fallback to single SIM mode and thereby obtain PS services using the first SIM to perform the requested data operation with the carrier network.

While it may be possible in some instances that PS services are available to the UE using the first SIM in a single SIM mode, it may still be preferred under some circumstances (e.g., depending on subscription characteristics, user preferences, etc.) not to use the PS services of the first SIM to perform the requested operation. For example, if roaming data charges would be incurred by using PS services from the first SIM to perform the requested operation, fallback to single SIM mode and use of PS services from the first SIM might not be selected as a data path to perform the requested data operation. If roaming data charges would not be incurred by using PS services from the first SIM to perform the requested operation (e.g., if the first SIM is not roaming, or if the first SIM is roaming but the requested data operation is permitted while roaming without incurring data roaming charges), fallback to single SIM mode and use of PS services from the first SIM might be selected as a data path to perform the requested data operation. If desired, any number of additional or alternate conditions may be considered when determining whether to use fallback to single SIM mode as a data path for the requested data operation with the carrier network of the first SIM.

In 508, the requested data operation may be performed using the determined data path. In some embodiments, the timing of performing the requested data operation (and/or the timing of determining the data path for the requested operation) may depend on certain conditions currently present at the UE.

For example, as one possibility, if the requested data operation is user initiated/triggered, and/or an application associated with the requested data operation is in active use by a user, the requested data operation may be considered a high priority data operation, and an attempt to find a data path for the operation and carry out the operation may be made immediately.

As another possibility, if the requested data operation is not user initiated, and an application associated with the requested data operation is not in active use by a user, but the user is otherwise actively using the UE, fallback to single SIM mode might potentially disrupt user activity. For example, if a transition to the single SIM mode occurs, PS services from the second SIM (e.g., which may be from a preferred inexpensive local data plan) may (at least temporarily) be unavailable, which may inconvenience the user in case such services are desired while the UE is in the single SIM mode. Accordingly, in some embodiments, a user activity level of the UE may be determined, and performance of the requested data operation (or possibly even determination of a data path for the requested data operation) may be delayed if the user activity level is above a certain threshold (e.g., a "user activity threshold"). Such a user activity level may be determined based on any of various possible considerations, including display status (e.g., display off/screen locked may be indicative of low or no user activity), application status(es), how recently user input (e.g., voice input, keypad/keyboard input, etc.) was received, and/or any of various other considerations.

As a further (additional or alternative) possibility, if fallback to single SIM mode is to be used to perform the requested data operation, that might interfere with other data activities. For example, if a transition to the single SIM mode occurs, the second SIM may (at least temporarily) be disconnected, so any current data exchanges or queued data on the second SIM may (at least temporarily) be delayed by such a transition. Accordingly, in some embodiments, a packet data activity level of the second SIM may be determined, and performance of the requested data operation (or possibly even determination of a data path for the requested data operation) may be delayed (e.g., for a predetermined period of time) if the packet data activity level on the second SIM is above a certain threshold (e.g., a "packet data activity threshold").

Thus, at least in some scenarios, if the user activity level of the UE is above a user activity threshold, and/or the packet data activity of the second SIM of the UE is above a packet data activity threshold, determining the data path for the requested data operation and/or performing the requested data operation may be delayed (e.g., for a predetermined period of time), while if the user activity level of the UE is below the user activity threshold, and/or the packet data activity of the second SIM of the UE is below the packet data activity threshold, determining the data path for the requested data operation and/or performing the requested data operation may be attempted without delay. Note that such (and/or other) conditions may be enforced individually or in combination, and/or may be enforced selectively depending on what data path(s) is (are) available to perform the requested data operation. For example, if an operation can be performed using Wi-Fi and/or the second SIM data plan, the UE may (at least in some instances) perform the data operation using such an interface even if there is currently packet data activity on the second SIM and/or user activity.

Note that if the requested data operation is performed by falling back to single SIM mode, at least in some instances the UE may transition back to the dual SIM mode (e.g., to regain access to PS and/or other services provided by the second SIM) once the requested data operation is complete.

Note also that in some instances, it may be determined that no data path to perform the requested data operation is available. For example, if fallback to single SIM mode to obtain PS services from the first SIM would trigger roaming data charges and user configuration and/or subscription configuration do not permit this, and use of an alternate data path is either not allowed or currently unavailable, there may (at least temporarily) not be a data path available for the requested data operation. In such an instance, the UE may wait for a certain (e.g., configurable) amount of time (e.g., "X"), then again attempt to find a data path to carry out the requested data operation (e.g., possibly also contingent on other UE conditions, such as user activity level, packet data activity, etc., as noted above).

If the UE is still unable to complete the requested data operation after a certain amount of time (e.g., "Y", where Y>X), and there is a fallback operation to the requested data operation that does not require access to the carrier PS network, the UE may attempt to perform the fallback operation. For example, if the requested data operation is retrieval of a visual voicemail from a server of a carrier associated with the first SIM, and the UE has been unable to complete the operation (i.e., to retrieve the visual voicemail) for the specified amount of time Y, the UE might provide a non-visual voicemail indication to the user as a fallback operation. The user might then be able to retrieve the non-visual voicemail using CS services available from the first SIM. As another possibility, in some instances an SMS based procedure may be used as an alternative to a packet data exchange based procedure for certain data operations.

FIGS. 6-10—Home Carrier Network Access Data Path Selection and Use Cases

FIGS. 6-10 are flowchart diagrams illustrating exemplary preferred data path selection and use cases for home carrier network access that may be used with a UE for which dual SIM functionality is available when in a roaming state. According to this exemplary dual SIM functionality, the first SIM, representing a first subscription, is available for CS (e.g., voice) services, and the second SIM, representing a second subscription, is available for PS (e.g., data) services while in dual SIM mode. Furthermore, in this particular scenario, the first SIM may be available for PS services when operating in single SIM mode. As previously noted, such a configuration may be useful (at least in some instances) if the first SIM provides a primary subscription of the UE, but the UE is in a roaming state with respect to the first SIM while the second SIM provides a local data subscription, such that PS services from the second SIM have lower data charges than might be available for PS services from the first SIM. It should also be noted that such a configuration may be useful in any of various other possible scenarios, and that any number of alternate implementations are also possible.

Note that FIGS. 6-9 and the information provided herein below in conjunction therewith are provided by way of example of various considerations and details relating to possible systems with which the method of FIG. 5 may be implemented, and are not intended to be limiting to the disclosure as a whole. Numerous variations and alternatives to the details provided herein below are possible and should be considered within the scope of the disclosure.

Figure 6:
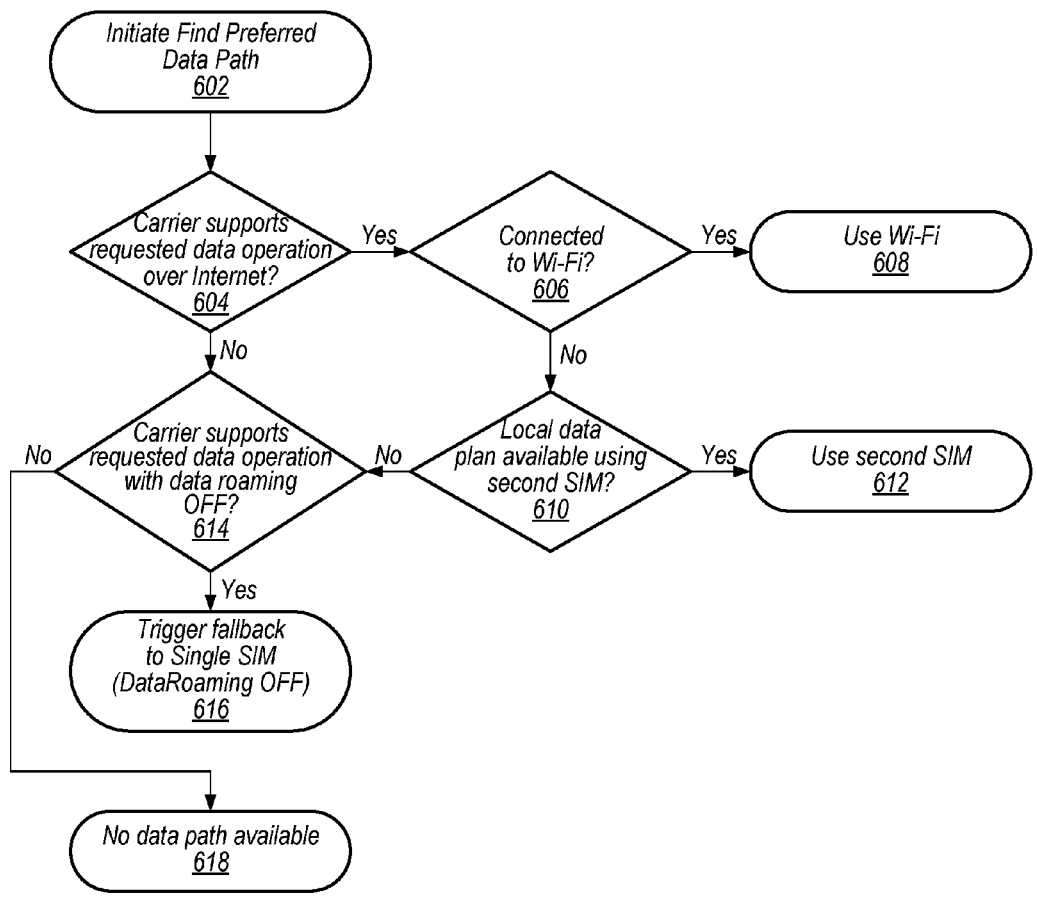
FIGS. 6-10 are flowchart diagrams illustrating example aspects of carrier network data operation use cases that may be performed by a multi-SIM capable UE, according to some embodiments.

FIG. 6 is a flowchart diagram illustrating an example method that may be used to find a preferred data path to access a home carrier network (i.e., the carrier network associated with the first SIM), according to some embodiments. As shown, the method of FIG. 6 may operate as follows.

In 602, the method for finding a preferred data path for a requested data operation with a home carrier network may be initiated.

In 604, it may be determined if the carrier supports performing the requested data operation over the Internet. This may depend on the nature of the requested data operation and/or the carrier's configuration.

In 606, if the carrier does support performing the requested data operation over the Internet, it may be determined if the UE has a Wi-Fi connection.

In 608, if the UE does have a Wi-Fi connection and the carrier does support performing the requested data operation over the Internet, the selected data path may include using Wi-Fi to perform the requested data operation.

In 610, if the carrier does support performing the requested data operation over the Internet, and the UE does not have a Wi-Fi connection, it may be determined if a local data plan is available by way of the second SIM.

In 612, if the UE does have a local data plan available by way of the second SIM, and the carrier does support performing the requested data operation over the Internet, the selected data path may include using the local data plan of the second SIM to perform the requested data operation.

In 614, if the carrier does not support performing the requested data operation over the Internet, or if the carrier does support performing the requested data operation over the Internet but no alternate network interface (e.g., via Wi-Fi, the second SIM, etc.) is available, it may be determined if the carrier supports the requested data operation without triggering data roaming (e.g., with data roaming off/disabled).

In 616, if the carrier supports the requested data operation without triggering data roaming, fallback to single SIM mode (e.g., with data roaming off) may be triggered, and the selected data path may include using packet switched services provided by the first SIM.

In 618, if the carrier does not support the requested data operation without triggering data roaming, it may be determined that no data path is currently available to perform the requested data operation.

Figure 7:
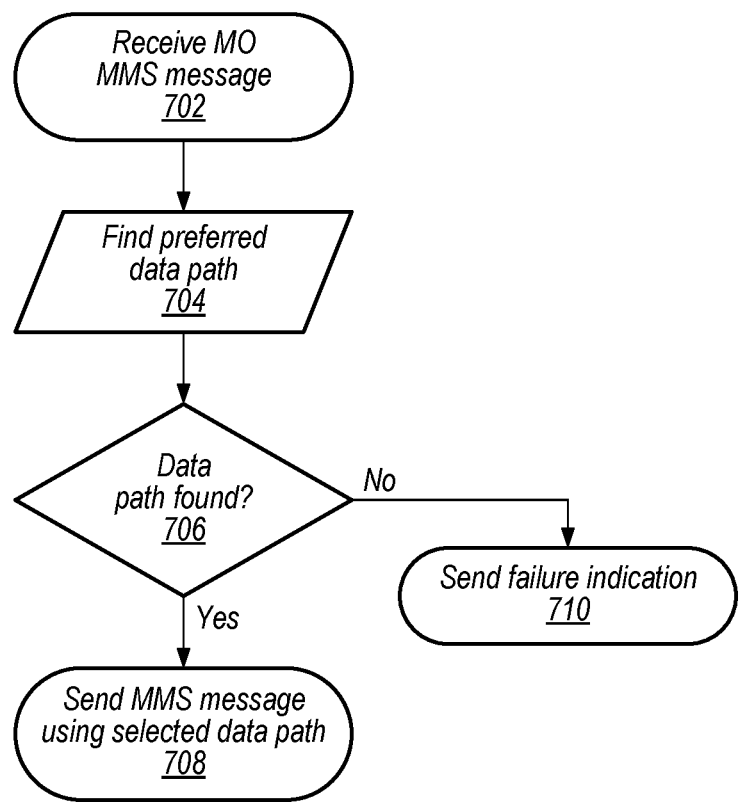

FIG. 7 is a flowchart diagram illustrating an example method that may be performed by a dual SIM UE to send a mobile originated (MO) multimedia messaging service (MIMS) message, according to some embodiments. As shown, the method of FIG. 7 may operate as follows.

In 702, the MO MMS message (or an indication of the MO MMS message) may be received. The MO MMS message may be received by way of user input from a user of the UE.

In 704, a preferred data path for the MO MMS message may be determined. For example, the UE may invoke a process such as the method of FIG. 6 to attempt to find a preferred data path for the MO MMS message.

In 706, it may be determined if a data path was found.

In 708, if a data path was found, the MO MMS message may be sent using the selected data path.

In 710, if no data path was found, the MO MMS message may not be sent, and instead an indication of failure to send the MMS message may be provided to the user.

Figure 8:
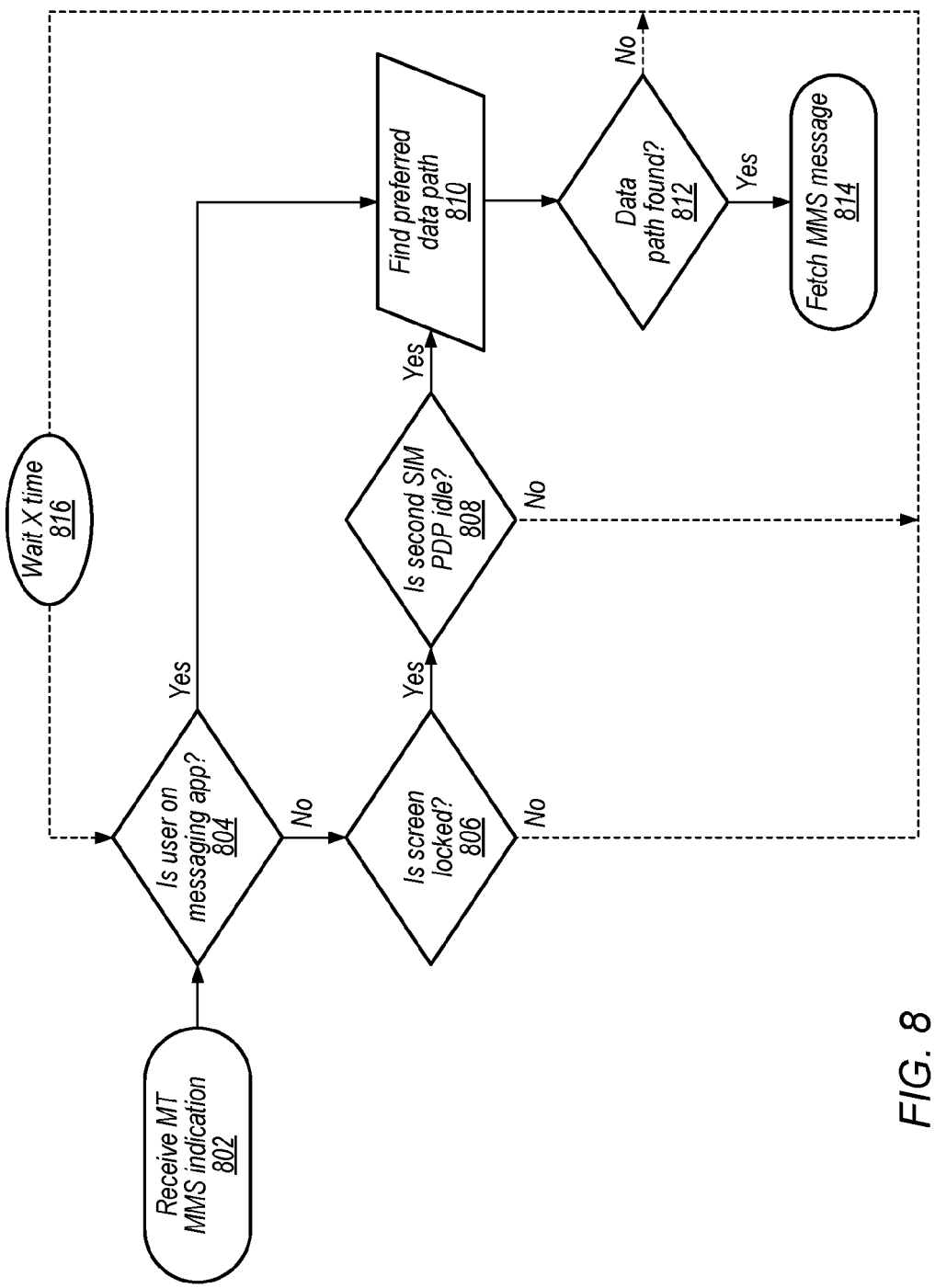

FIG. 8 is a flowchart diagram illustrating an example method that may be performed by a dual SIM UE to retrieve a mobile terminated (MT) MMS message, according to some embodiments. As shown, the method of FIG. 8 may operate as follows.

In 802, an indication of the MT MMS message may be received. According to some embodiments, the indication may be received via a short messaging service (SMS) message from the home carrier of the first SIM of the UE. Other ways of receiving the indication of the MT MMS message are also possible.

In 804, it may be determined if a user of the UE is currently using a messaging application associated with the MT MMS.

In 806, if a user of the UE is not using a messaging application associated with the MT MMS, it may be determined if a screen of the UE is locked (e.g., if the display is off). This may serve as an indicator of a user activity level of the UE. For example, if the display is not off, this may be an indication that the UE is currently being used (e.g., in which case attempting to retrieve the MT MMS message might disturb the user). In contrast, if the display is off, this may be an indication that the UE is not currently being used (e.g., in which case attempting to retrieve the MT MMS message may not disturb the user).

In 808, if the screen of the UE is locked, it may be determined whether the second SIM of the UE is currently engaged in data exchange or is idle (e.g., packet data protocol (PDP) idle). Since retrieving the MT MMS could utilize fallback to single SIM, which would interrupt such operations, at least in some embodiments this may be used as a condition for proceeding to attempt to find a preferred data path for and fetching the MT MMS.

In 810, if a user of the UE is using a messaging application associated with the MT MMS, or if a user of the UE is not using a messaging application associated with the MT MMS but the screen of the UE is locked and the second SIM of the UE is currently PDP idle, a preferred data path for the MT MMS message may be determined. For example, the UE may invoke a process such as the method of FIG. 6 to attempt to find a preferred data path for the MT MMS message.

In 812, it may be determined if a data path was found.

In 814, if a data path was found, the MT MMS message may be fetched using the selected data path.

In 816, if no data path was found, or if the screen of the UE is not locked, or if the second SIM of the UE is not currently PDP idle, the UE may wait a certain period of time ("X"). Once the time X has expired, the UE may return to step 804 and retry the method.

Figure 9:
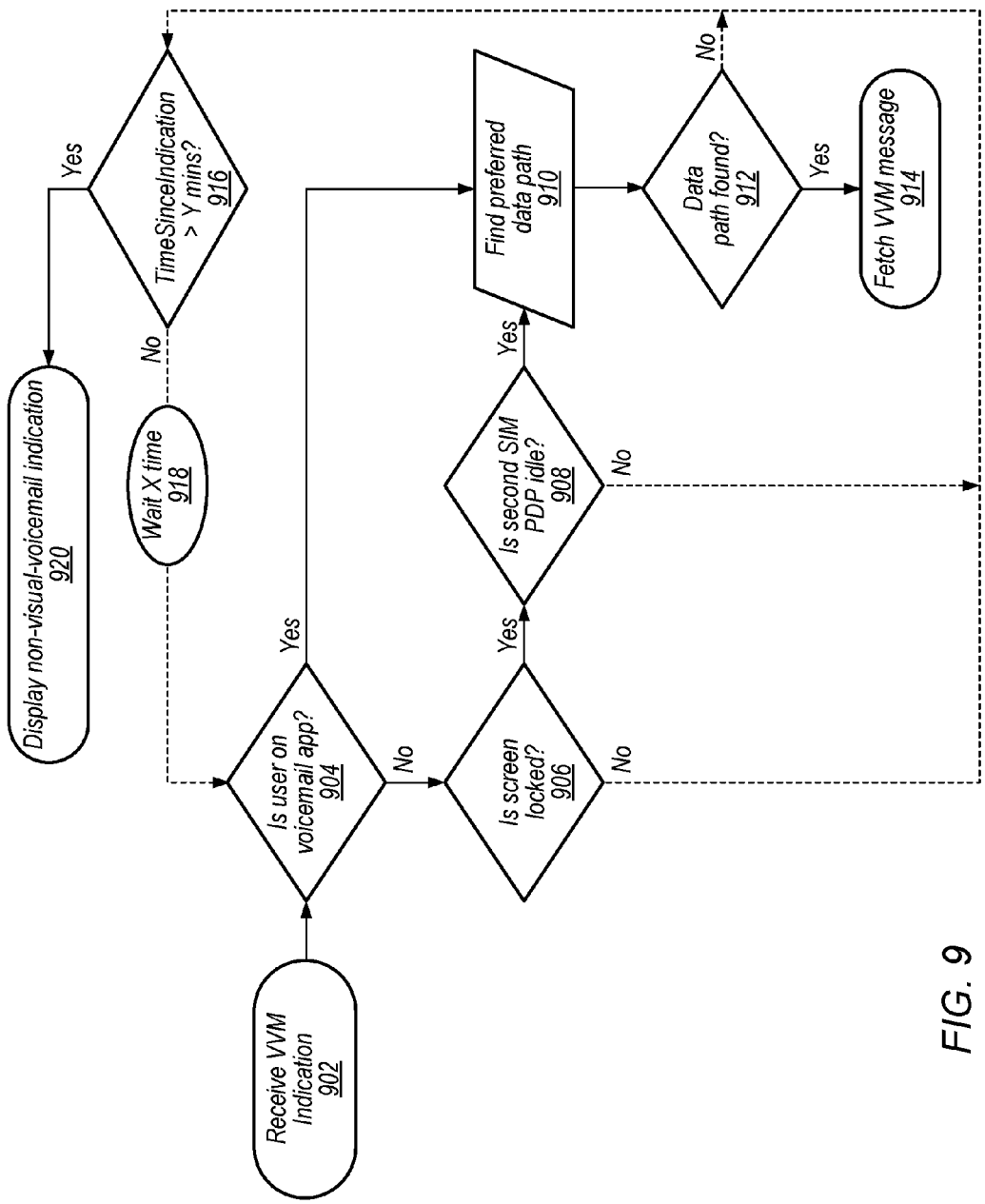

FIG. 9 is a flowchart diagram illustrating an example method that may be performed by a dual SIM UE to retrieve a visual voicemail (VVM) message, according to some embodiments. As shown, the method of FIG. 9 may operate as follows.

In 902, an indication of the VVM message may be received. According to some embodiments, the indication may be received via a SMS message from the home carrier of the first SIM of the UE. Other ways of receiving the indication of the VVM message are also possible.

In 904, it may be determined if a user of the UE is currently using a voicemail application associated with the VVM.

In 906, if a user of the UE is not using a messaging application associated with the VVM, it may be determined if a screen of the UE is locked (e.g., if the display is off). This may serve as an indicator of a user activity level of the UE. For example, if the display is not off, this may be an indication that the UE is currently being used (e.g., in which case attempting to retrieve the VVM message might disturb the user). In contrast, if the display is off, this may be an indication that the UE is not currently being used (e.g., in which case attempting to retrieve the VVM message may not disturb the user).

In 908, if the screen of the UE is locked, it may be determined whether the second SIM of the UE is currently engaged in data exchange or is PDP idle. Since retrieving the VVM message could utilize fallback to single SIM, which would interrupt such operations, at least in some embodiments this may be used as a condition for proceeding to attempt to find a preferred data path for and fetching the VVM.

In 910, if a user of the UE is using a voicemail application associated with the VM, or if a user of the UE is not using a voicemail application associated with the VVM but the screen of the UE is locked and the second SIM of the UE is currently PDP idle, a preferred data path for the VVM message may be determined. For example, the UE may invoke a process such as the method of FIG. 6 to attempt to find a preferred data path for the VVM message.

In 912, it may be determined if a data path was found.

In 914, if a data path was found, the VVM message may be fetched using the selected data path.

In 916, if no data path was found, or if the screen of the UE is not locked, or if the second SIM of the UE is not currently PDP idle, the UE may determine if it has been more than a certain amount of time ("Y") since the VVM indication was originally received.

In 918, if less than the time Y has passed, the UE may wait a certain period of time ("X"). Note that X may be less than Y, at least in some embodiments. Once the time X has expired, the UE may return to step 904 and retry the method.

In 920, if more than the time Y has passed, the UE may cease attempting to retrieve the VVM message and instead provide an indication of a non-visual voicemail (e.g., corresponding to the VVM message but accessible using CS services available from the first SIM) to a user of the UE. The user may then be able to retrieve the non-visual voicemail.

Figure 10:
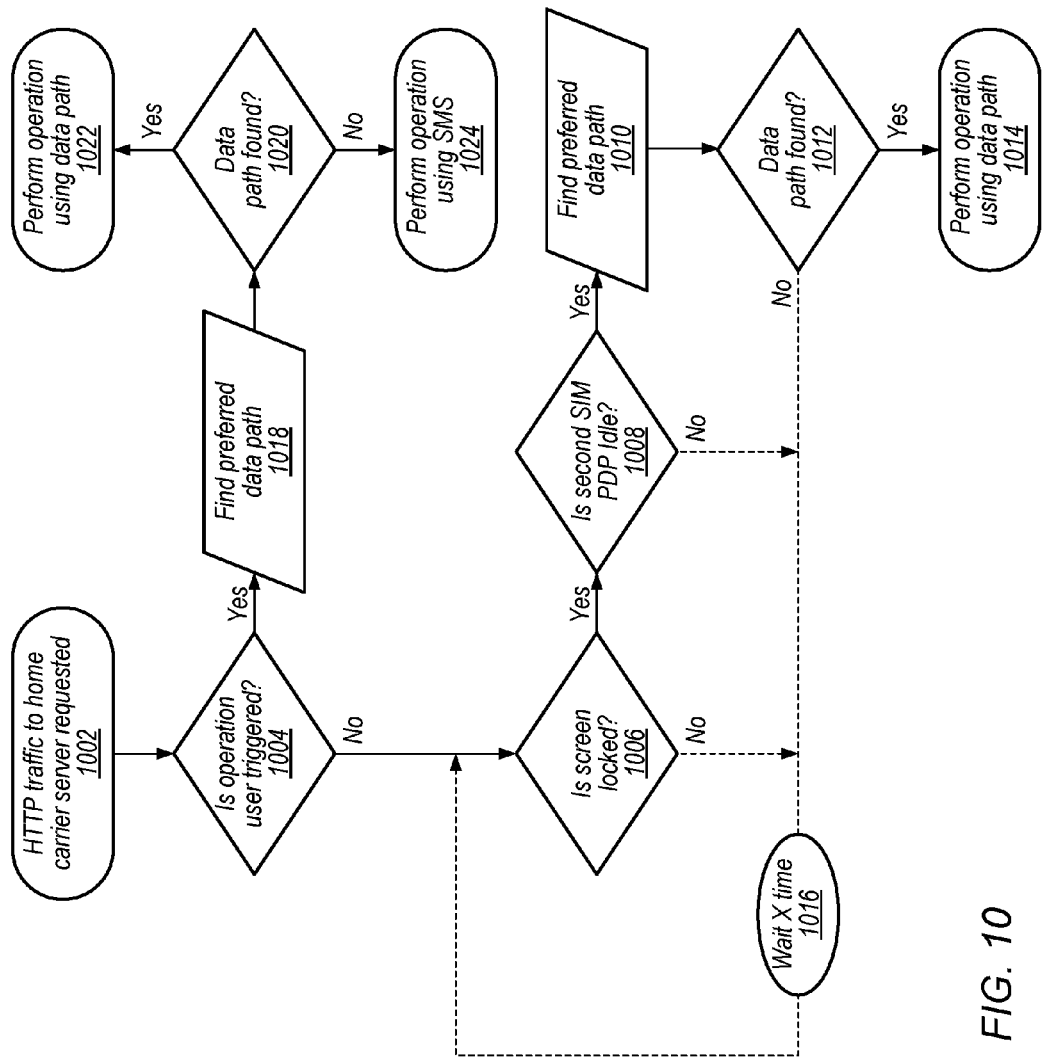

FIG. 10 is a flowchart diagram illustrating an example method that may be performed by a dual SIM UE to perform an HTTP data traffic operation with a home carrier server, where a fallback/substitute operation to the HTTP data traffic operation can be performed over SMS, according to some embodiments. As shown, the method of FIG. 10 may operate as follows.

In 1002, the HTTP data traffic operation with the home carrier of the first SIM of the UE may be requested.

In 1004, it may be determined if the HTTP data traffic operation is user initiated.

In 1006, if the HTTP data traffic operation is not user initiated, it may be determined if a screen of the UE is locked (e.g., if the display is off). This may serve as an indicator of a user activity level of the UE. For example, if the display is not off, this may be an indication that the UE is currently being used (e.g., in which case attempting to perform the HTTP data traffic operation might disturb the user). In contrast, if the display is off, this may be an indication that the UE is not currently being used (e.g., in which case attempting to perform the HTTP data traffic operation may not disturb the user).

In 1008, if the screen of the UE is locked, it may be determined whether the second SIM of the UE is currently engaged in data exchange or is PDP idle. Since performing the HTTP data traffic operation could utilize fallback to single SIM, which would interrupt such operations, at least in some embodiments this may be used as a condition for proceeding to attempt to find a preferred data path for and performing the HTTP data traffic operation.

In 1010, if the HTTP data traffic operation is not user initiated but the screen of the UE is locked and the second SIM of the UE is currently PDP idle, a preferred data path for the HTTP data traffic operation may be determined. For example, the UE may invoke a process such as the method of FIG. 6 to attempt to find a preferred data path for the HTTP data traffic operation.

In 1012, it may be determined if a data path was found.

In 1014, if a data path was found, the HTTP data traffic operation may be performed using the selected data path.

In 1016, if no data path was found, or if the screen of the UE is not locked, or if the second SIM of the UE is not currently PDP idle, the UE may wait a certain period of time ("X"). Once the time X has expired, the UE may return to step 1006 and retry the following portion of the method.

In 1018, if the HTTP data traffic operation is user initiated, a preferred data path for the HTTP data traffic operation may also be determined. For example, the UE may invoke a process such as the method of FIG. 6 to attempt to find a preferred data path for the HTTP data traffic operation.

In 1020, it may be determined if a data path was found.

In 1022, if a data path was found, the HTTP data traffic operation may be performed using the selected data path.

In 1024, if no data path was found, the HTTP data traffic operation (or an alternative fallback operation may be performed using SMS messaging with the home carrier network.

In the following further exemplary embodiments are provided.

One set of embodiments may include a method, comprising: by a wireless user equipment (UE) device: operating in a dual subscriber identity module (SIM) mode, wherein in the dual SIM mode packet switched (PS) services are not available using a first SIM of the UE; receiving an indication of a requested data operation with a carrier PS network associated with the first SIM of the UE while the UE is in the dual SIM mode; determining a data path for the requested data operation; and performing the requested data operation using the determined data path.

According to some embodiments, determining the data path for the requested data operation further comprises:

determining whether the requested data operation with the carrier PS network can be performed via a data path other than cellular PS services using the first SIM of the UE.

According to some embodiments, if the requested data operation with the carrier PS network can be performed via a data path other than cellular PS services using the first SIM of the UE and a Wi-Fi network interface is available, the determined data path utilizes the Wi-Fi network interface.

According to some embodiments, if the requested data operation with the carrier PS network can be performed via a data path other than cellular PS services using the first SIM of the UE and cellular PS services using a second SIM of the UE are available, the determined data path utilizes the cellular PS services using the second SIM of the UE.

According to some embodiments, in a single SIM mode cellular PS services using the first SIM of the UE are available, wherein if the requested data operation with the carrier PS network cannot be performed via a data path other than cellular PS services using the first SIM of the UE, the determined data path utilizes cellular PS services provided by the first SIM of the UE in the single SIM mode.

According to some embodiments if the requested data operation with the carrier PS network can be performed via a data path other than cellular PS services using the first SIM of the UE but no alternate data path is available, the determined data path also utilizes cellular PS services provided by the first SIM of the UE in the single SIM mode.

According to some embodiments, the method further comprises: determining a user activity level of the UE; delaying determining the data path for the requested data operation and/or performing the requested data operation if the user activity level of the UE is above a user activity threshold.

According to some embodiments, the method further comprises: determining a packet data activity level of a second SIM of the UE; delaying determining the data path for the requested data operation and/or performing the requested data operation if the packet data activity level of the second SIM of the UE is above a packet data activity threshold.

A further set of embodiments may include a wireless user equipment (UE) device, comprising: a radio; and a processing element operably coupled to the radio; wherein the radio and the processing element are configured for dual subscriber identity module (SIM) operation, wherein the radio and the processing element are configured to: receive an indication of a requested data operation with a packet data network of a carrier associated with a first SIM of the UE, wherein the packet data network of the carrier associated with the first SIM of the UE is unavailable to the UE in a dual SIM mode; determine if one or more conditions for performing the requested data operation are present; determine if a data path to perform the requested data operation is available; and perform the requested data operation if the one or more conditions for performing the requested data operation are present and if a data path to perform the requested data operation is available.

According to some embodiments, to determine if a data path to perform the requested data operation is available, the radio and the processing element are further configured to: determine if the requested data operation can be performed via the Internet; determine if a network interface providing access to the Internet is available, and determine that a data path to perform the requested data operation is available if the requested data operation can be performed via the Internet and if a network interface providing access to the Internet is available.

According to some embodiments, to determine if a network interface providing access to the Internet is available, the radio and the processing element are further configured to: determine if a Wi-Fi network interface providing access to the Internet is available; and determine if a cellular network interface providing access to the Internet using a second SIM of the UE is available.

According to some embodiments, to determine if a data path to perform the requested data operation is available, the radio and the processing element are further configured to: determine if the requested data operation can be performed via the packet data network of the carrier associated with the first SIM of the UE without triggering data roaming in a single SIM mode; and determine that a data path to perform the requested data operation is available if the requested data operation can be performed via the packet data network of the carrier associated with the first SIM of the UE without triggering data roaming in a single SIM mode.

According to some embodiments, to determine if one or more conditions for performing the requested data operation are present, the radio and the processing element are further configured to: determine if the requested data operation is user triggered; and determine that the one or more conditions for performing the requested data operation are present if the requested data operation is user triggered.

According to some embodiments, to determine if one or more conditions for performing the requested data operation are present, the radio and the processing element are further configured to: determine if a user activity level of the UE is below a user activity threshold and a packet data activity level of a second SIM of the UE is below a packet data activity threshold; and determine that the one or more conditions for performing the requested data operation are present if the user activity level of the UE is below the user activity threshold and the packet data activity level of the second SIM of the UE is below the packet data activity threshold.

According to some embodiments, the radio and the processing element are further configured to: wait a first predetermined period of time if the one or more conditions for performing the requested data operation are not present or if a data path to perform the requested data operation is not available; determine if the one or more conditions for performing the requested data operation are present and if a data path to perform the requested data operation is available after expiration of the first predetermined period of time; perform the requested data operation available after expiration of the first predetermined period of time if the one or more conditions for performing the requested data operation are present and if a data path to perform the requested data operation is available after expiration of the first predetermined period of time.

According to some embodiments, the radio and the processing element are further configured to: determine if the requested data operation can be performed via short messaging service (SMS) if the requested data operation is user triggered and a data path to perform the requested data operation is not available; perform the requested data operation via SMS if it is determined that requested data operation can be performed via SMS.

A still further set of embodiments may include a non-transitory computer accessible memory medium, comprising program instructions for a wireless user equipment (UE) device that, when executed by the UE device, cause the UE to: receive an indication of a requested data operation with a packet data network of a carrier associated with a first SIM of the UE, wherein the packet data network of the carrier associated with the first SIM of the UE is unavailable to the UE in a dual SIM mode, wherein the packet data network of the carrier associated with the first SIM of the UE is available to the UE in a single SIM mode; determine if one or more conditions for performing the requested data operation are present; transition from the dual SIM mode to the single SIM mode to perform the requested data operation if the one or more conditions for performing the requested data operation are present; and transition from the single SIM mode to the dual SIM mode after performing the requested data operation.

According to some embodiments, the one or more conditions for performing the requested data operation comprise one or more of: the requested data operation comprise being user initiated; an application associated with the requested data operation being in use; or a user activity level of the UE being below a user activity threshold and a packet data activity level of a second SIM of the UE being below a packet data activity threshold.

According to some embodiments, the requested data operation comprises sending or retrieving a multimedia messaging service (MMS) message.

According to some embodiments, the requested data operation comprises retrieving a visual voice mail (VVM) message An additional exemplary embodiment may include a wireless user equipment (UE) device, comprising: a radio; and an processing element operably coupled to the radio; wherein the UE is configured to implement any or all parts of any of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
by a wireless user equipment (UE) device:
operating in a dual subscriber identity module (SIM) mode;
receiving an indication of a requested packet switched (PS) data operation with a carrier PS network associated with a first SIM of the UE while the UE is in the dual SIM mode;
determining that PS services are not available using the first SIM of the UE while in the dual SIM mode, wherein said determination is based at least in part on subscription characteristics of the first SIM;
determining a data path for the requested PS data operation other than cellular PS services using the first SIM of the UE in the dual SIM mode in response to the determination that PS services are not available using the first SIM of the UE while in the dual SIM mode; and
performing the requested PS data operation using the determined data path.

2. The method of claim 1, wherein if the requested data operation with the carrier PS network can be performed via a data path other than cellular PS services using the first SIM of the UE and a Wi-Fi network interface is available, the determined data path utilizes the Wi-Fi network interface.

3. The method of claim 1, wherein if the requested data operation with the carrier PS network can be performed via a data path other than cellular PS services using the first SIM of the UE and cellular PS services using a second SIM of the UE are available, the determined data path utilizes the cellular PS services using the second SIM of the UE.

4. The method of claim 1, wherein in a single SIM mode, cellular PS services using the first SIM of the UE are available, wherein if the requested PS data operation with the carrier PS network cannot be performed via a data path other than cellular PS services using the first SIM of the UE, the determined data path utilizes cellular PS services provided by the first SIM of the UE in the single SIM mode.

5. The method of claim 4, wherein if the requested PS data operation with the carrier PS network can be performed via a data path other than cellular PS services using the first SIM of the UE but no alternate data path is available, the determined data path also utilizes cellular PS services provided by the first SIM of the UE in the single SIM mode.

6. The method of claim 1, wherein the method further comprises:
determining a user activity level of the UE;
delaying determining the data path for the requested PS data operation and/or performing the requested PS data operation if the user activity level of the UE is above a user activity threshold.

7. The method of claim 1, wherein the method further comprises:
determining a packet data activity level of a second SIM of the UE;
delaying determining the data path for the requested PS data operation and/or performing the requested PS data operation if the packet data activity level of the second SIM of the UE is above a packet data activity threshold.

8. A wireless user equipment (UE) device, comprising:
a radio; and
a processing element operably coupled to the radio;
wherein the radio and the processing element are configured to:
  operate in a dual subscriber identity module (SIM) mode;
  receive an indication of a requested packet switched (PS) data operation with a carrier PS network associated with a first SIM of the UE while the UE is in the dual SIM mode;
  determine that PS services are not available using the first SIM of the UE while in the dual SIM mode, wherein said determination is based at least in part on subscription characteristics of the first SIM;
  determine a data path for the requested PS data operation other than cellular PS services using the first SIM of the UE in the dual SIM mode in response to the determination that PS services are not available using the first SIM of the UE while in the dual SIM mode; and
  perform the requested PS data operation using the determined data path.

9. The UE of claim 8, wherein to determine the data path to perform the requested PS data operation, the radio and the processing element are further configured to:
  determine if the requested PS data operation can be performed via the Internet;
  determine if a network interface providing access to the Internet is available,
  wherein, if the requested PS data operation can be performed via the Internet and if the network interface providing access to the Internet is available, the determined data path utilizes the network interface providing access to the Internet.

10. The UE of claim 9, wherein to determine if the network interface providing access to the Internet is available, the radio and the processing element are further configured to:
  determine if a Wi-Fi network interface providing access to the Internet is available; and
  determine if a cellular network interface providing access to the Internet using a second SIM of the UE is available.

11. The UE of claim 8, wherein if the requested data operation with the carrier PS network can be performed via a data path other than cellular PS services using the first SIM of the UE and cellular PS services using a second SIM of the UE are available, the determined data path utilizes the cellular PS services using the second SIM of the UE.

12. The UE of claim 8, wherein in a single SIM mode, cellular PS services using the first SIM of the UE are available, wherein if the requested PS data operation with the carrier PS network cannot be performed via a data path other than cellular PS services using the first SIM of the UE, the determined data path utilizes cellular PS services provided by the first SIM of the UE in the single SIM mode.

13. The UE of claim 8, wherein said determining a data path for the requested PS operation other than cellular PS services using the first SIM of the UE in the dual SIM mode is performed further in response to a determination that the requested PS data operation is user triggered.

14. The UE of claim 8, wherein the radio and the processing element are further configured to:
  wait a first predetermined period of time if a data path to perform the requested PS data operation is not available;
  determine if a data path to perform the requested PS data operation is available after expiration of the first predetermined period of time;
  perform the requested PS data operation available after expiration of the first predetermined period of time if a data path to perform the requested PS data operation is available after expiration of the first predetermined period of time.

15. An apparatus, comprising:
one or more processing elements configured for dual subscriber identity module (SIM) operation, wherein the processing elements are configured to:
  receive an indication of a requested packet switched (PS) data operation with a packet data network of a carrier associated with a SIM of the apparatus that does not currently have data access, wherein the SIM does not currently have data access based at least in part on subscriptions characteristics of the SIM;
  determine if one or more conditions for performing the requested PS data operation are present;
  determine if a data path to perform the requested PS data operation is available; and
  perform the requested PS data operation if the one or more conditions for performing the requested PS data operation are present and if a data path to perform the requested PS data operation is available.

16. The apparatus of claim 15, wherein to determine if the data path to perform the requested PS data operation is available, the processing elements are further configured to:
  determine if the requested PS data operation can be performed via the Internet;
  determine if a network interface providing access to the Internet is available, and
  determine that a data path to perform the requested PS data operation is available if the requested PS data operation can be performed via the Internet and if a network interface providing access to the Internet is available.

17. The apparatus of claim 16, wherein to determine if the network interface providing access to the Internet is available, the processing element is further configured to:
  determine if a Wi-Fi network interface providing access to the Internet is available; and
  determine if a cellular network interface providing access to the Internet using a different SIM of the apparatus is available.

18. The apparatus of claim 15, wherein the processing elements are further configured to:
  wait a first predetermined period of time if the one or more conditions for performing the requested PS data operation are not present or if a data path to perform the requested PS data operation is not available;
  determine if the one or more conditions for performing the requested PS data operation are present and if a data path to perform the requested PS data operation is available after expiration of the first predetermined period of time;
  perform the requested PS data operation after expiration of the first predetermined period of time if the one or more conditions for performing the requested PS data operation are present and if a data path to perform the requested PS data operation is available after expiration of the first predetermined period of time.

19. The apparatus of claim 15, wherein to determine if one or more conditions for performing the requested PS data operation are present, the processing element is further configured to:
   determine if the requested PS data operation is user triggered; and
   determine that the one or more conditions for performing the requested PS data operation are present if the requested PS data operation is user triggered.

20. The apparatus of claim 15, wherein to determine if one or more conditions for performing the requested PS data operation are present, the processing element is further configured to:
   determine if a user activity level of the UE is below a user activity threshold and a packet data activity level of any other SIMs of the UE is below a packet data activity threshold; and
   determine that the one or more conditions for performing the requested PS data operation are present if the user activity level is below the user activity threshold and the packet data activity level is below the packet data activity threshold.

* * * * *